United States Patent
Buhulaiga et al.

(10) Patent No.: US 11,189,088 B2
(45) Date of Patent: Nov. 30, 2021

(54) INTEGRATED SOLUTION FOR GENERATING ENVIRONMENTAL EMERGENCY RESPONSE, PREPAREDNESS, AND INVESTIGATION

(71) Applicant: Saudi Arabian Oil Company, Dhahran (SA)

(72) Inventors: Eyad Buhulaiga, Khobar (SA); Basil Milibary, Khobar (SA); Mohammed Tomehy, Khobar (SA); Yousif Abualsoud, Khobar (SA); Hamdy A. Noureldin, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 365 days.

(21) Appl. No.: 16/220,650

(22) Filed: Dec. 14, 2018

(65) Prior Publication Data
US 2020/0193699 A1 Jun. 18, 2020

(51) Int. Cl.
*G06T 17/05* (2011.01)
*G06F 16/29* (2019.01)
(Continued)

(52) U.S. Cl.
CPC ............... *G06T 17/05* (2013.01); *G01W 1/10* (2013.01); *G06F 3/048* (2013.01); *G06F 16/29* (2019.01)

(58) Field of Classification Search
CPC ......... G06T 17/05; G06F 16/29; G06F 3/048; G01W 1/10
(Continued)

(56) References Cited

U.S. PATENT DOCUMENTS 9,794,755 B1 * 10/2017 South .................. G01S 1/68
2005/0055233 A1 3/2005 Wenzlau
(Continued)

FOREIGN PATENT DOCUMENTS

GB 2452014 2/2009
WO 2019058379 3/2019

OTHER PUBLICATIONS

PCT International Search Report and Written Opinion in International Appln. No. PCT/US2019/067419, dated Feb. 27, 2020, 12 pages.
(Continued)

*Primary Examiner* — David T Welch
(74) *Attorney, Agent, or Firm* — Fish & Richardson P.C.

(57) ABSTRACT

A system and a computer-implemented method includes the following. Field environmental data is collected from environmental systems in real time over a network for an environmental incident in an area of interest. Weather systems are tracked in real time for the environmental incident in the area of interest using weather data collected from weather systems. Changes in vapor cloud images are tracked in real time for the environmental incident in the area of interest. Vapor cloud predictions are determined using a vapor cloud model. Events that occur in the area of interest are tracked in real time. Emergency preparedness procedures corresponding to the area of interest are tracked. Root cause analysis is performed for the environmental incident using the collected data, the tracked data, and the determined vapor cloud predictions. An action is performed based on the root cause analysis.

17 Claims, 5 Drawing Sheets

(51) Int. Cl.
  *G01W 1/10*     (2006.01)
  *G06F 3/048*    (2013.01)
(58) Field of Classification Search
  USPC .......................................................... 702/3
  See application file for complete search history.

(56) References Cited

U.S. PATENT DOCUMENTS

| | | | | |
|---|---|---|---|---|
| 2008/0062167 | A1* | 3/2008 | Boggs | G06T 19/00 345/419 |
| 2012/0256762 | A1* | 10/2012 | Greenberger | H04Q 9/00 340/870.03 |
| 2013/0073996 | A1* | 3/2013 | Garcia | G06Q 10/0637 715/764 |
| 2013/0100268 | A1* | 4/2013 | Mihailidis | G08B 21/0492 348/77 |
| 2014/0089243 | A1* | 3/2014 | Oppenheimer | G06F 21/88 706/46 |
| 2015/0178647 | A1 | 6/2015 | Wiggins et al. | |
| 2017/0140390 | A1 | 5/2017 | Degeneffe et al. | |
| 2018/0067593 | A1* | 3/2018 | Tiwari | G08B 13/04 |
| 2018/0239948 | A1* | 8/2018 | Rutschman | G06T 7/20 |
| 2019/0354921 | A1* | 11/2019 | Bolta | G06Q 10/087 |
| 2019/0362523 | A1* | 11/2019 | Ngoi | G08B 27/001 |
| 2020/0175842 | A1* | 6/2020 | Merjanian | G06T 11/60 |
| 2020/0193341 | A1 | 6/2020 | Barak et al. | |

OTHER PUBLICATIONS

International Search Report and Written Opinion issued in International Application No. PCT/US2019/065667 dated Mar. 20, 2020, 15 pages.
Alhajraf et al., "Real-time Response System for the Prediction of the Atmospheric Transport of Hazardous Materials," Journal of Loss Prevention in the Process Industries, vol. 18, No. 4-6, Jul. 1, 2005, 6 pages.
Qiao et al., "Advanced CFD Modeling on Vapor Dispersion and Vapor Cloud Explosion," Journal of Loss Prevention in the Process Industries, vol. 23, No. 6, Nov. 1, 2010, 6 pages.
Knegtering et al., "The Safety Barometer: How Safe is My Plant Today? Is Instantaneously Measuring Safety Level Utopia or Realizable?" Journal of Loss Prevention in the Process Industries, 2013, 26, 9 pages.
Wang et al. "Development and Application of Equipment Maintenance and Safety Integrity Management System," Journal of Loss Prevention in the Process Industries, 2011, 24:321-3 32.
Wang et al., "Research and Application of Risk and Condon Based Maintenance Task Optimization Technology in an Oil Transfer Station," Journal of Loss Prevention in the Process Industries, 2012, 25:1018-1027, 10 pages.

* cited by examiner

INTEGRATED SOLUTION FOR GENERATING ENVIRONMENTAL EMERGENCY RESPONSE, PREPAREDNESS, AND INVESTIGATION

BACKGROUND

The present disclosure applies to techniques used in oil and gas processing. Some processes and operations in the field of oil and gas processing can create situations that result in releasing emissions into the environment. For example, hydrocarbon streams that flow in oil gas pipelines may include corrosive material that can result in the leakage of hydrocarbons and sulfur components into the atmosphere. Operating facilities are mandated to comply with safety and regulatory requirements. Emergency response procedures at the operating facilities are designed to provide timely and consistent methodologies for controlling environmental hazards, such as harmful leaks and emissions, within a short period of time. In conventional systems, violations and accidents are typically dealt with in reactive mode, often requiring swift corrective action to return systems to normal. Conventional systems can also lack processes and techniques for conducting root cause analysis. Typical processes and techniques for dealing with environmental hazards occur offline rather than processing information and reacting in a dynamic, efficient way.

SUMMARY

The present disclosure describes techniques that can be used for monitoring and analyzing environmental emergency response preparedness in oil and gas processing and for providing corrective actions to mitigate risks. In some implementations, a computer-implemented method, includes: collecting, in real time over a network for an environmental incident in an area of interest, field environmental data from environmental systems; tracking, in real time for the environmental incident in the area of interest, weather systems using weather data collected from weather systems; tracking, in real time for the environmental incident in the area of interest, changes in vapor cloud images and determining, using a vapor cloud model, vapor cloud predictions; tracking, in real time, events that occur in the area of interest; tracking emergency preparedness procedures corresponding to the area of interest; performing root cause analysis for the environmental incident using the collected data, the tracked data, and the determined vapor cloud predictions; and performing an action based on the root cause analysis.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, techniques described in the present disclosure can be used to resolve the vagueness and inefficiency of response routes during an emergency. Unlike commercial, off-the-shelf (COTS) methods that are currently available, the techniques in the present disclosure can provide, in a single system, needed advantages and functionalities. Second, the described techniques can integrate multiple products that are required to meet the objectives of reliability and integrity performance solutions. Third, a reliable methodology can be provided for controlling an emergency associated with a leak or a spill, with minimum side effects and within a short period of time. Fourth, proactive and reactive actions can be suggested to a user who can then initiate suggested actions.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1A:
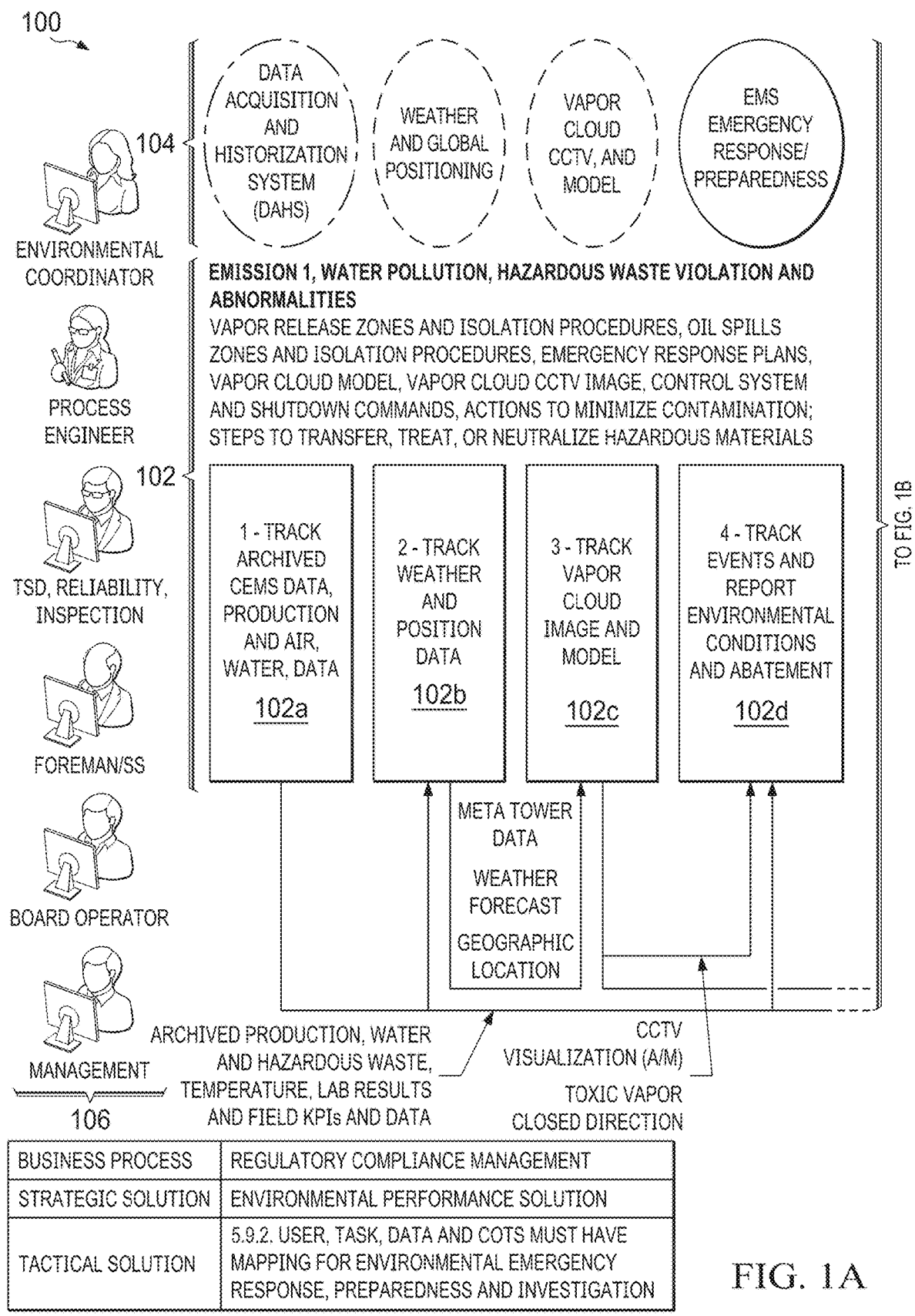
FIGS. 1A and 1B collectively depict a block diagram showing examples of actions that can be performed in a process for providing an integrated solution for generating environmental emergency response, preparedness, and investigation, according to some implementations of the present disclosure.

The following detailed description describes techniques for monitoring and analyzing environmental emergency response preparedness in oil and gas processing, and for providing corrective actions to mitigate risks. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques described in the present disclosure can provide solutions for the problems and challenges associated with environmental incident investigation and auditing. The solutions can integrate different disjoint systems to perform the analysis efficiently and systematically through one collaborative work environment that is shared by different stakeholders. Table 1 lists a non-limiting set of example systems that can be integrated using the techniques described in the present disclosure:

TABLE 1

Systems integrated into a collaborative work environment

| | System | Abbreviation | Description |
|---|---|---|---|
| 1 | Data Acquisition & Historization System | DAHS | Data warehouse system that receives real-time and historical time-stamped plant data from a variety of sources |
| 2 | Lab Management System | LMS | Data warehouse system storing lab results and analysis |
| 3 | Weather Positioning | — | Technology that provides weather condition data (for example, temperature, wind speed, and wind direction) |
| 4 | Vapor Cloud Model | — | Technology that uses component data (for example, type, amount, pressure, temperature, speed, and density) to provide a vapor cloud diagram showing the cloud direction and size |
| 4 | Key Performance Indicators (KPI) Management System | KPIMS | Mathematical calculation engine to perform thermodynamic and non-thermodynamic calculations |
| 5 | Environmental Management System | EMS | Framework that facilitates the capture of EMS regulatory reporting, emissions and air quality, wastewater, and hazardous waste management functions |
| 6 | Decision Support and Visualization System | DSV | System providing real-time access to performance information, including performance data acquisition, aggregation, transformation, and presentation |
| 7 | Process Safety and Operational Risk Management System | PSORMS | System providing the facility emergency procedure tasks |

At a high level, techniques described in the present disclosure can include the following operations and activities that pertain to an environmental incident and an area of interest that may be affected by the environmental incident. Field environment data for the area of interest is collected. Weather data is tracked for the area of interest, including wind speed, wind direction, and other weather factors. Vapor cloud images are tracked, and vapor cloud models are used. Events in and around the area of interest are tracked. Environmental conditions are reported. Emergency preparedness procedures are tracked. Root cause analysis is performed for the environmental incident. Displays associated with the environmental incident are prepared for displaying an emission and vapor cloud model on a three-dimensional (3D) plan model. Proactive/reactive data and KPIs are displayed for the environmental incident. Alerts and advisories are displayed to mitigate the issue.

Collecting field environment data can include processes for retrieving site field data. The site field data can include, for example, information associated with a leak source (such as the exact geographical location of the leak), leaked material, leaked material condition/state (for example, vapor or liquid), leak flowrate leak time (to track, for example, the affected area based on time of leakage), and process material flow temperature and pressure.

Tracking weather data, including wind speed and wind direction, can include online processes that continuously track the weather condition data. The weather condition data can include, for example, wind direction wind speed, humidity, and temperature.

Tracking vapor cloud images can be based on the use of models, tracked events, and reported environmental condition. Once the information is made available, the system can automatically generate a vapor cloud image that is specific to the leaked material specification, as pre-defined in a system database (e.g. density). The image can be visualized in an area map, for example, as part of a graphical user interface (GUI). The image can include the affected area and covered area in a graphical representation (or a photographic image) of the leaked material.

Tracking emergency preparedness procedures can occur after the cloud image is generated. Emergency response routes and procedures that are automatically generated by the system can be followed during an evacuation and a safety response to the emergency.

Root cause analysis can be performed for the environmental incident. The root cause analysis can include case information that has been pre-engineered and configured. For example, IF-THEN cases can include, for example: "IF the wind direction is South, THEN the evacuation route is to the East or West" and "IF the pipe pressure is less than a Pressure P, THEN the root causes are X, and the corrective action is Y."

Information for the incident can be prepared for display in a GUI. The GUI can present graphical information that includes the emission and the vapor cloud model on a 3D plan model. The GUI can present proactive/reactive data and KPIs associated with the environmental incident. The GUI can also display alerts and advisories for mitigating issues associated with the environmental incident. A 3D image of the emergency response plan, including an evacuation route, can be automatically generated and displayed in a user dashboard. The display can include context information associated with the procedures, the root causes, and the corrective actions that need to be followed. Proactive and reactive KPIs can be presented in user dashboards.

Vapor cloud formations and their behavior can be affected by the content of materials in the vapor. For example, hydrocarbon fuels, such as gasoline, hexane, cyclohexane, and other liquids can vaporize to form a vapor cloud. During an explosion that may result from an ignition of a cloud of flammable vapor, gas, or mist, flame speeds can accelerate to high velocities that can produce a significant overpressure. Vapor cloud models can be used to make predictions based on vapor cloud formations and the types of materials in the vapor cloud. For example, the vapor cloud predictions can include a size and shape of the vapor cloud and concentrations of hazardous components of the vapor cloud at different locations within the vapor cloud. The predictions can be time-based, for example, indicating a range of possible concentrations at time T and corresponding risks to populations.

When any emergency occurs, an emergency response scenario can include an effective response that is planned using at least the following. Real-time situational information can be accessed, including weather and local traffic conditions. For example, the term real-time can correspond to events that occur within a specified period of time, such as one minute, one second, or milliseconds. Vapor cloud modelling applications and tools can be used to provide a location, direction, and intensity of a vapor cloud. The vapor cloud modelling applications and tools can also be used to determine or estimate associated risks and plan evacuation routes.

Weather information that is tracked can be used to assess current and near-future (for example, within hours) conditions. Weather information can include, for example, real-time wind speeds, real-time wind directions, real-time precipitation conditions, real-time temperature conditions, real-time humidity conditions. The weather information can be used to determine weather predictions related to wind, precipitation, temperature, and humidity.

Vapor cloud models can use, as input, an identification of the chemical substance(s) in a vapor cloud, a source location and size (including quantities of the substances in the vapor cloud), release rates, elevation(s) (of at least the source), and wind directions and speed. The vapor cloud models can be used to calculate the extent of the vapor cloud and potential consequences, such as potential effects on populations, fatalities, or injuries (for example, burn injuries). Relief plots generated by the vapor cloud models can be used to visualize the extent or impact of a potential vapor cloud explosion.

In some implementations, vapor cloud modelling can also be used for plant siting design to satisfy safety criteria, such as to select a site that limits potential dangers to populations. For example, the safety criteria can include, or can be affected by, locations and occupancy levels of buildings, locations of temporary buildings, locations of new process units, and overpressure designs for buildings. Vapor cloud modelling can be used offline to study risk scenarios of potential vapor cloud explosions and to prepare for emergencies. Online vapor cloud modelling can include responding immediately to an occurrence of an accidental release, and for use in designing effective response plans.

Vapor cloud models can be generated from scenario files. For example, a user can use a scenario file to store data needed to model vapor clouds. Scenarios can be stored in a scenario repository. The data for a scenario can include, for example, chemicals, site information, weather information, sources of leaks, sizes of leaks, and pipe diameters. In the case of an emergency, a user (for example, emergency response personnel or oil/gas/chemical management personnel) can open the most appropriate scenario file and input current conditions. The current conditions can include, for example, current weather data such as wind speed and direction. The user can quickly alter various parameters to match current events and conditions in the area in order to generate updated output.

Depending on the current characteristics of an environmental incident, for example, the user can select a scenario that is most relevant to the environmental incident. Identification of the scenario can be based on a user selections that identify the type of the emergency (including a type of leak, a size of the leak, or the substance(s) involved in the leak) and current conditions. Models that are associated with the scenarios can be based on leak types that include, for example, direct leaks, puddles, tanks, and pipelines (for example, oil pipelines).

Figure 1B:
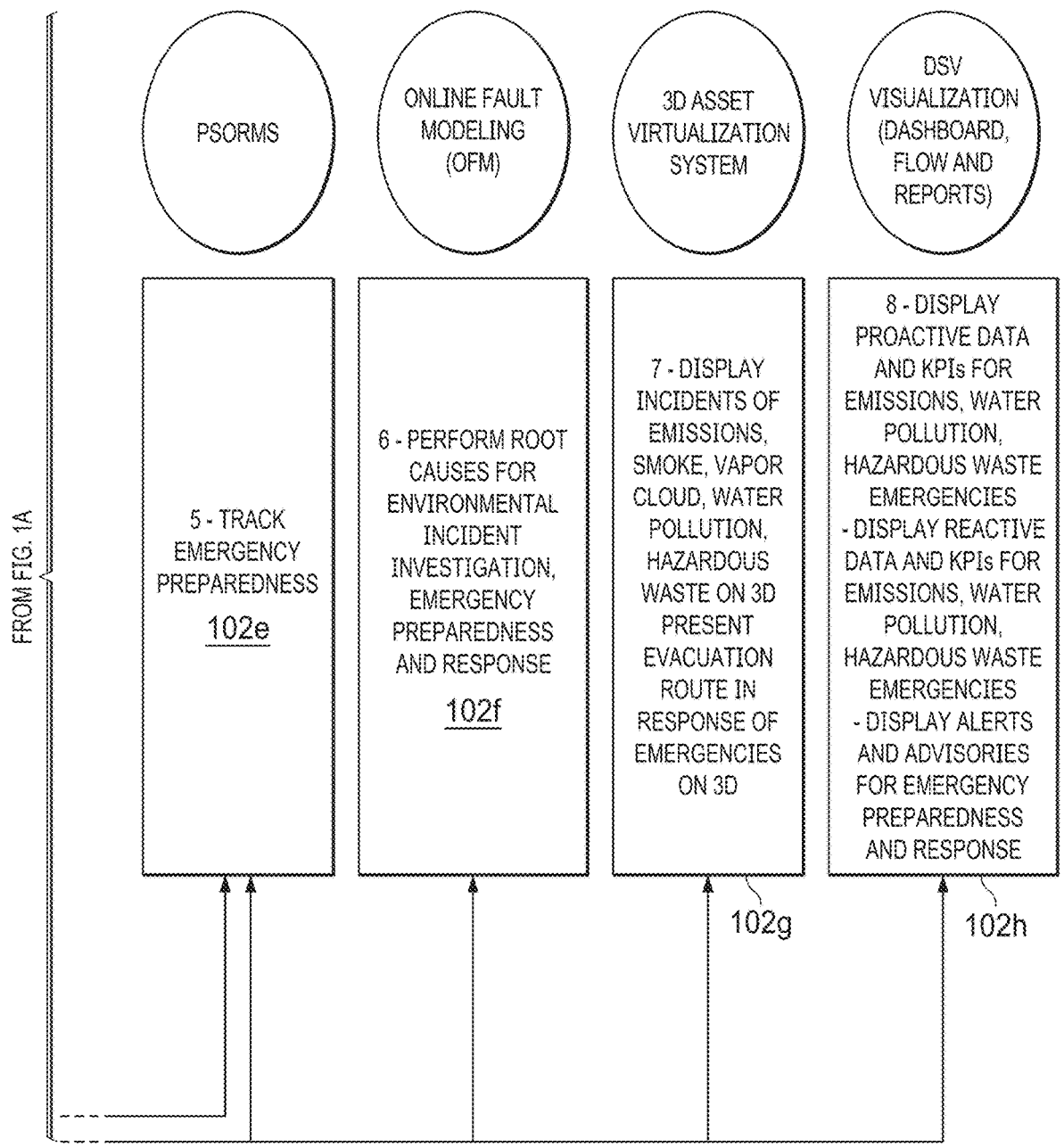

FIGS. 1A and 1B collectively depict a block diagram showing examples of actions 102 that can be performed in a process 100 for providing an integrated solution for generating environmental emergency response, preparedness, and investigation, according to some implementations of the present disclosure. The actions 102 can generally include proactive and reactive actions related to emissions, water pollution, hazardous waste violations and abnormalities, vapor release zones and isolation procedures, oil spill zones and isolation procedures, vapor cloud closed circuit television (CCTV) images, emergency response plans, control systems and shutdown commands, vapor cloud models, actions to minimize contamination, and steps to transfer, treat, or neutralize hazardous materials. The proactive and reactive data can further include alerts and advisories for mitigating the environmental incident.

The actions 102 can include the following actions. Actions 102a can include tracking that occurs for archived continuous emission monitoring system (CEMS) data, production, air, and water. Actions 102a can also include performing archiving operations on information associated with production, water and hazardous waste, temperatures, lab results, and field KPIs and data. Actions 102b can include tracking weather and position data. Actions 102b can also include transmitting meta tower data, weather forecast information, and geographical location information. Actions 102c can include tracking vapor cloud images and using models. Actions 102d can include tracking events and reporting environmental conditions and abatement. Actions 102d can also include transmitting CCTV visualization and toxic vapor cloud direction information. Actions 102e can include tracking emergency preparedness. Actions 102f can include performing root cause analysis for environmental incidents, including investigation, emergency preparedness, and subsequent responses. Actions 102g can include preparing a 3D display that includes information for emissions, vapor clouds, pollution, hazardous waste, emergency response, and emergencies. Actions 102h can include providing a display that includes proactive data and KPIs for emissions, water, pollution and hazardous waste emergencies. The display can include, for example, reactive data and KPIs for emissions, water, pollution, and hazardous waste emergencies. The display can also include information regarding alerts and advisories for emergency preparedness and response. The information provided by and used by the actions 102 can correspond to systems 104 and users 106. The systems 104 can include, for example, a data acquisition and historization system (DAHS), weather and global positioning, vapor CCTV and modelling, continuous emission monitoring system (CEMS) emergency response and preparedness, the Process Safety and Operational Risk Management System (PSORMS), online fault modeling (OFM), 3D asset visualization systems, and data set viewer (DSV) visualization (dashboards and reports). Users 106 can include, for example, environmental coordinators, process engineers, technical support document (TSD), reliability and inspection engineers, foremen, board operators, and management.

Figure 2:
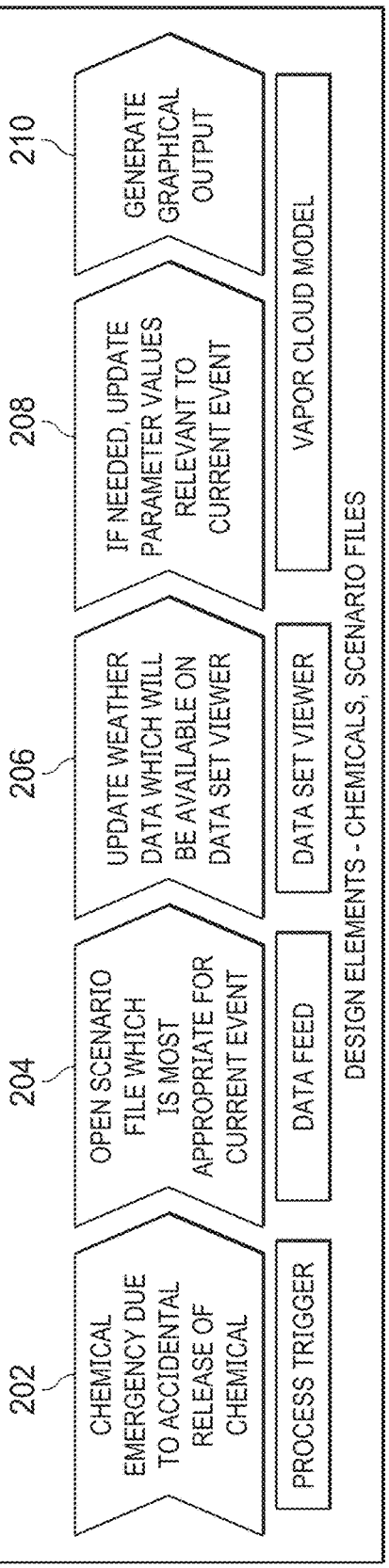
FIG. 2 is a block diagram showing examples of scenario file design elements for an emergency response system, according to some implementations of the present disclosure.

FIG. 2 is a block diagram showing examples of scenario file design elements 200 for an emergency response system, according to some implementations of the present disclosure. A process trigger element 202, for example, can serve as a trigger for the process, such as if a chemical emergency exists due to an accidental release or spill of a chemical. A data feed element 204, for example, can include opening a scenario file that is most important, or relevant, to a current event. A DSV element 206, for example, can include a visualization on which the user can view weather updates and input updates into the scenario. A vapor cloud model update element 208, for example, can be used by the user, as needed, to update parameter values that are relevant to the current event. A vapor cloud model output element 210, for example, can be used to generate graphical output that is displayed to the user.

Figure 3:
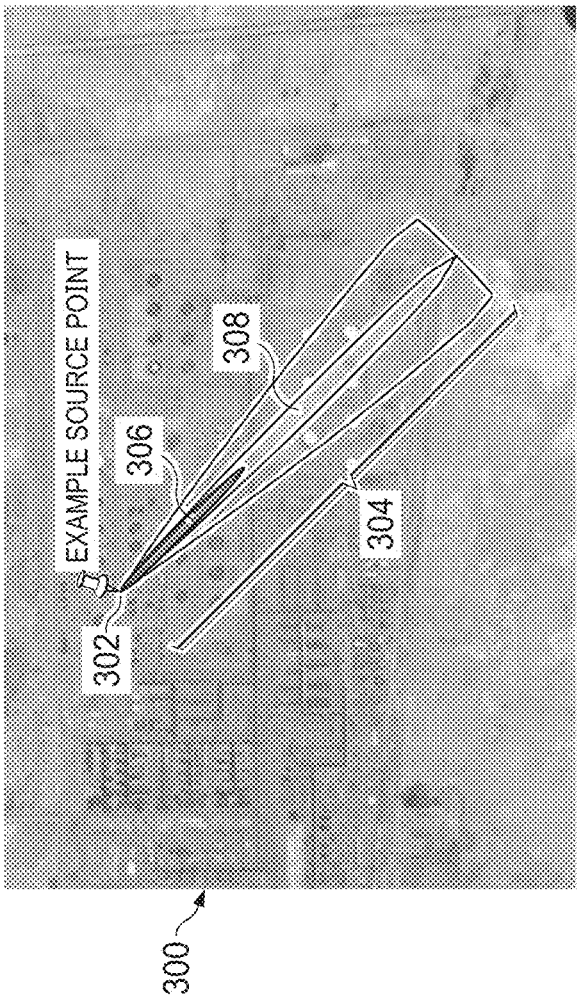
FIG. 3 is a map of an example of a source point and a projected subsequent path of a vapor cloud, according to some implementations of the present disclosure.

FIG. 3 is a map 300 of an example of a source point 302 and a projected subsequent path 304 of a vapor cloud, according to some implementations of the present disclosure. The source point 302 can be a source of an accidental release of a chemical or other substance that produces a vapor cloud. The projected subsequent path 304 of the vapor cloud can include a high concentration area 306 and a low concentration area 308. The map can include color coding, for example, that indicates various levels of concentrations. In some implementations, the map can be part of a GUI that presents a time-based animation of the vapor cloud, showing potential areas of effect of the vapor cloud. Maps can include other information, such as links to emergency service agencies and weather information, such as wind direction and speed. In some implementations, the map can provide the safest evacuation routes to the closest assembly point.

Figure 4:
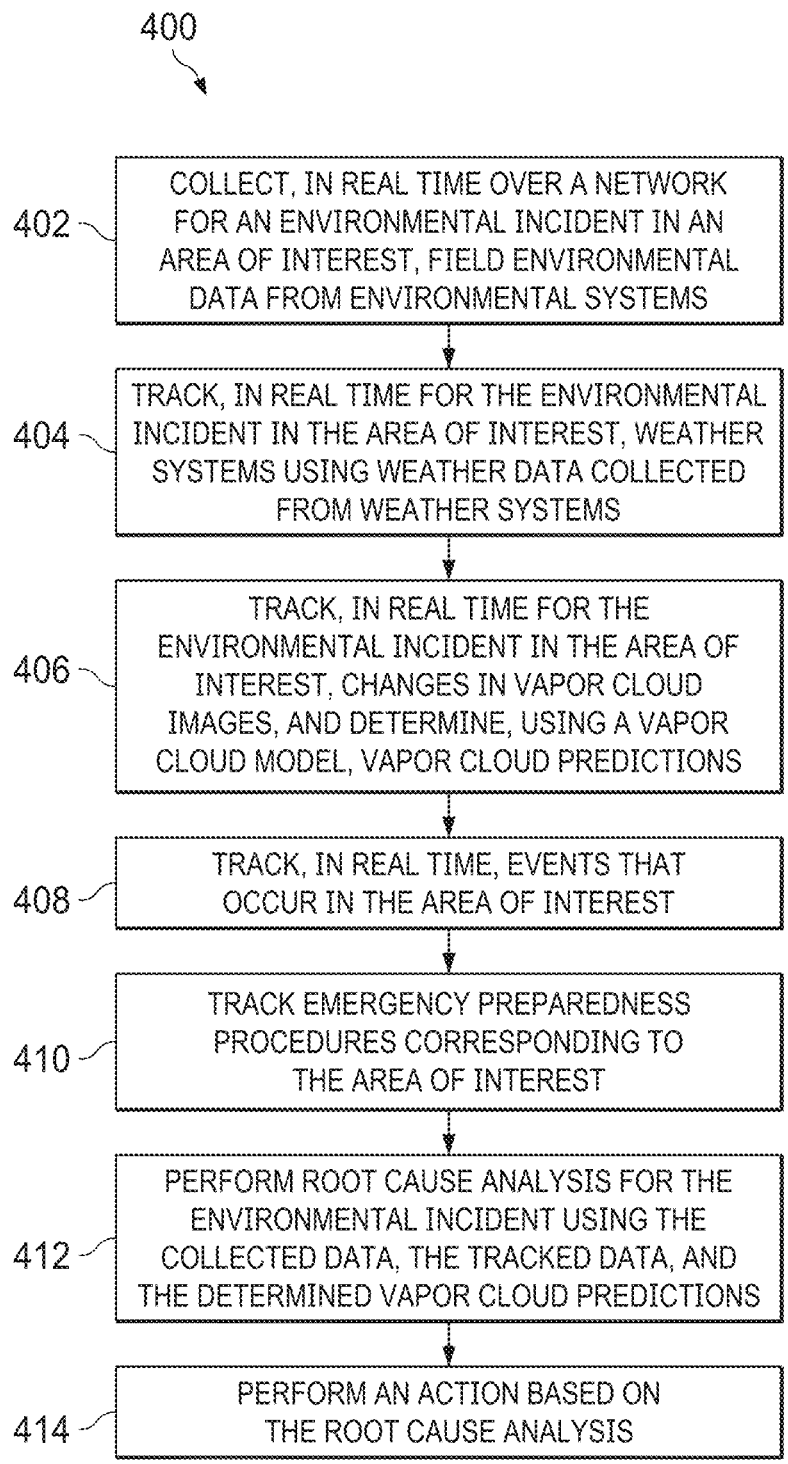
FIG. 4 is a flowchart of an example method for providing an integrated solution for generating environmental emergency response, preparedness, and investigation, according to some implementations of the present disclosure.

FIG. 4 is a flowchart of an example method 400 for providing an integrated solution for generating environmental emergency response, preparedness, and investigation, according to some implementations of the present disclosure. For clarity of presentation, the description that follows generally describes method 400 in the context of the other figures in this description. However, it will be understood that method 400 may be performed, for example, by any suitable system, environment, software, and hardware, or a combination of systems, environments, software, and hardware, as appropriate. FIGS. 1A-3 provide detailed examples of data and processes that support the method 400. In some implementations, various steps of method 400 can be run in parallel, in combination, in loops, or in any order.

At 402, field environmental data for an environmental incident in an area of interest is collected in real time over a network from environmental systems. For example, the system 100 can provide environmental data to a user. The information that is provided can correspond, for example, to a vapor cloud and chemical spill in a particular area, such as downwind from a chemical processing site. From 402, method 400 proceeds to 404.

At 404, weather systems are tracked in real time for the environmental incident in the area of interest using weather data collected from weather systems. For example, the actions 102b can provide tracking weather and position data, including transmitting meta tower data, weather forecast information, and geographical location information. The weather data can include, for example, forecasted changes in wind directions and wind velocities that can affect the a speed and direction of the spread of a vapor cloud. From 404, method 400 proceeds to 406.

At 406, changes in vapor cloud images are tracked in real time for the environmental incident in the area of interest, and vapor cloud predictions are determined using a vapor cloud model. As an example, the actions 102c can track vapor clouds and associated events. From 406, method 400 proceeds to 408.

At 408, events that occur in the area of interest are tracked in real time. For example, the actions 102d can track associated events. The associated events can include actions by individuals and agencies at the site of source of the vapor cloud and actions taken some distance from the site of the source. From 408, method 400 proceeds to 410.

At 410, emergency preparedness procedures corresponding to the area of interest are tracked. As an example, the actions 102e can track emergency preparedness procedures associated with a release vapor cloud. The emergency preparedness procedures can include, for example, procedures for communicating with government and safety agencies and procedures for providing warnings or evacuation notices that are provided to media outlets and to individuals (such as through automatically-sent text messages to mobile devices). From 410, method 400 proceeds to 412.

At 412, root cause analysis for the environmental incident is performed using the collected data, the tracked data, and the determined vapor cloud predictions. As an example, the actions 102f can be user to perform root cause analysis based on the information received for released vapor cloud. From 412, method 400 proceeds to 414.

At 414, an action is performed based on the root cause analysis. For example, environmental conditions can be reported for the environmental incident. In another example, graphical information for the environmental incident providing, for display in a graphical user interface (GUI). The graphical information for the environmental incident can includes a 3-dimensional (3D) vapor cloud model displayed in combination with a 3D plan model of the area of interest. In another example, information can be provided for use in the GUI to display proactive and reactive data and key process indicators (KPIs) for the environmental incident. In another example, the actions that occur can include automatic warnings sent to news agencies and to human beings in who live in and around an emergency response area. In some implementations, a user can provide inputs identifying actions to be performed (based on the information that is displayed), and the actions can be performed or initiated. Some of the information that is displayed to the user can include suggestions for steps to take or agencies to contact, for example. After 414, method 400 stops.

Figure 5:
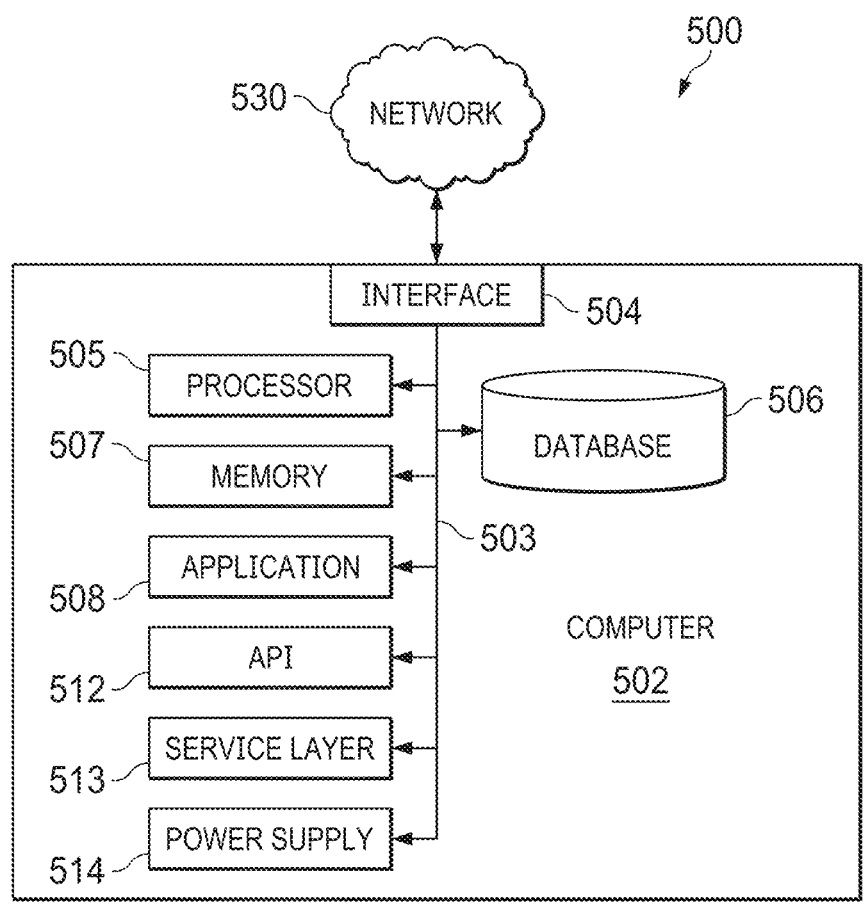
FIG. 5 is a block diagram illustrating an example computer system used to provide computational functionalities associated with described algorithms, methods, functions, processes, flows, and procedures as described in the instant disclosure, according to some implementations of the present disclosure.

FIG. 5 is a block diagram of an example computer system 500 used to provide computational functionalities associated with described algorithms, methods, functions, processes, flows, and procedures, as described in the instant disclosure, according to some implementations of the present disclosure. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, a touch screen that can accept user information, and an output device that conveys information associated with the operation of the computer 502, including digital data, visual, or audio information (or a combination of information), or a graphical-type user interface (UI) (or GUI).

The computer 502 can serve in a role as a client, network component, a server, a database, a persistency, or components of a computer system for performing the subject matter described in the instant disclosure. The illustrated computer 502 is communicably coupled with a network 530. In some implementations, one or more components of the computer 502 may be configured to operate within environments, including cloud-computing-based, local, global, and a combination of environments.

At a high level, the computer 502 is an electronic computing device operable to receive, transmit, process, store, or manage data and information associated with the described subject matter. According to some implementations, the computer 502 may also include or be communicably coupled with an application server, email server, web server, caching server, streaming data server, or a combination of servers.

The computer 502 can receive requests over network 530 from a client application (for example, executing on another computer 502) and respond to the received requests by processing the received requests using an appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, hardware or software (or a combination of both hardware and software), may interface with each other or the interface 504 (or a combination of both), over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 and other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, a language providing data in extensible markup language (XML) format, or any other suitable computer language. While illustrated as an integrated component of the computer 502, alternative implementations may illustrate the API 512 or the service layer 513 as stand-alone components in relation to other components of the computer 502 and other components communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 and other components connected to the network 530 (whether illustrated or not). For example, database 506 can be an in-memory, conventional, or a database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with this disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either useror non-user-replaceable. In some implementations, the power supply 514 can include power-conversion or management circuits (including recharging, standby, or a power management functionality). In some implementations, the power-supply 514 can include a power plug to allow the computer 502 to be plugged into a wall socket or a power source to, for example, power the computer 502 or recharge a rechargeable battery.

There may be any number of computers 502 associated with, or external to, a computer system containing computer 502, each computer 502 communicating over network 530. Further, the term "client," "user," and other appropriate terminology may be used interchangeably, as appropriate, without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: collecting, in real time over a network for an environmental incident in an area of interest, field environmental data from environmental systems; tracking, in real time for the environmental incident in the area of interest, weather systems using weather data collected from weather systems; tracking, in real time for the environmental incident in the area of interest, changes in vapor cloud images and determining, using a vapor cloud model, vapor cloud predictions; tracking, in real time, events that occur in the area of interest; tracking emergency preparedness procedures corresponding to the area of interest; performing root cause analysis for the environmental incident using the collected data, the tracked data, and the determined vapor cloud predictions; and performing an action based on the root cause analysis.

The foregoing and other described implementations can each, optionally, include one or more of the following features:

A first feature, combinable with any of the following features, the method further comprising: wherein performing the action based on the root cause analysis includes one or more of: reporting environmental conditions for the environmental incident; providing, for display in a graphical user interface (GUI), graphical information for the environmental incident; providing, for display in the GUI, proactive and reactive data and key process indicators (KPIs) for the environmental incident; receiving, from a user, inputs identifying actions to be performed; and performing the action based on the inputs.

A second feature, combinable with any of the previous or following features, wherein the graphical information for the environmental incident includes a 3-dimensional (3D) vapor cloud model displayed in combination with a 3D plan model of the area of interest.

A third feature, combinable with any of the previous or following features, wherein the weather data includes real-time wind speeds, real-time wind directions, real-time precipitation conditions, real-time temperature conditions, real-time humidity conditions, and weather predictions related to wind, precipitation, temperature, and humidity.

A fourth feature, combinable with any of the previous or following features, wherein the vapor cloud predictions include a size of the vapor cloud, a shape of the vapor cloud, and concentrations of hazardous components of the vapor cloud at different locations within the vapor cloud.

A fifth feature, combinable with any of the previous or following features, wherein the proactive and reactive data includes alerts and advisories for mitigating the environmental incident.

A sixth feature, combinable with any of the previous or following features, the method further comprising: receiving, from input provided by the user, scenario information for a scenario associated with potential environmental incidents, the scenario information including information defining a type of emergency including a type of hazardous material; storing the scenario information for the scenario in a scenarios repository; receiving, from input provided by the user, scenario search criteria for identifying the scenario from stored scenarios in the scenarios repository; and providing the scenario that matches the scenario selection criteria.

In a second implementation, a non-transitory, computer-readable medium storing one or more instructions executable by a computer system to perform operations comprising: collecting, in real time over a network for an environmental incident in an area of interest, field environmental data from environmental systems; tracking, in real time for the environmental incident in the area of interest, weather systems using weather data collected from weather systems; tracking, in real time for the environmental incident in the area of interest, changes in vapor cloud images and determining, using a vapor cloud model, vapor cloud predictions; tracking, in real time, events that occur in the area of interest; tracking emergency preparedness procedures corresponding to the area of interest; performing root cause analysis for the environmental incident using the collected data, the tracked data, and the determined vapor cloud predictions; and performing an action based on the root cause analysis.

The foregoing and other described implementations can each, optionally, include one or more of the following features:

A first feature, combinable with any of the following features, the operations further comprising: wherein performing the action based on the root cause analysis includes one or more of: reporting environmental conditions for the environmental incident; providing, for display in a GUI, graphical information for the environmental incident; providing, for display in the GUI, proactive and reactive data and KPIs for the environmental incident; receiving, from a user, inputs identifying actions to be performed; and performing the action based on the inputs.

A second feature, combinable with any of the previous or following features, wherein the graphical information for the environmental incident includes a 3D vapor cloud model displayed in combination with a 3D plan model of the area of interest.

A third feature, combinable with any of the previous or following features, wherein the weather data includes real-time wind speeds, real-time wind directions, real-time precipitation conditions, real-time temperature conditions, real-time humidity conditions, and weather predictions related to wind, precipitation, temperature, and humidity.

A fourth feature, combinable with any of the previous or following features, wherein the vapor cloud predictions include a size of the vapor cloud, a shape of the vapor cloud, and concentrations of hazardous components of the vapor cloud at different locations within the vapor cloud.

A fifth feature, combinable with any of the previous or following features, wherein the proactive and reactive data includes alerts and advisories for mitigating the environmental incident.

A sixth feature, combinable with any of the previous or following features, the operations further comprising: receiving, from input provided by the user, scenario information for a scenario associated with potential environmental incidents, the scenario information including information defining a type of emergency including a type of hazardous material; storing the scenario information for the scenario in a scenarios repository; receiving, from input provided by the user, scenario search criteria for identifying the scenario from stored scenarios in the scenarios repository; and providing the scenario that matches the scenario selection criteria.

In a third implementation, a computer-implemented system, comprising one or more processors and a non-transitory computer-readable storage medium coupled to the one or more processors and storing programming instructions for execution by the one or more processors, the programming instructions instructing the one or more processors to perform operations comprising: collecting, in real time over a network for an environmental incident in an area of interest, field environmental data from environmental systems; tracking, in real time for the environmental incident in the area of interest, weather systems using weather data collected from weather systems; tracking, in real time for the environmental incident in the area of interest, changes in vapor cloud images and determining, using a vapor cloud model, vapor cloud predictions; tracking, in real time, events that occur in the area of interest; tracking emergency preparedness procedures corresponding to the area of interest; performing root cause analysis for the environmental incident using the collected data, the tracked data, and the determined vapor cloud predictions; and performing an action based on the root cause analysis.

The foregoing and other described implementations can each, optionally, include one or more of the following features:

A first feature, combinable with any of the following features, the operations further comprising: wherein performing the action based on the root cause analysis includes one or more of: reporting environmental conditions for the environmental incident; providing, for display in a GUI, graphical information for the environmental incident; providing, for display in the GUI, proactive and reactive data and KPIs for the environmental incident; receiving, from a user, inputs identifying actions to be performed; and performing the action based on the inputs.

A second feature, combinable with any of the previous or following features, wherein the graphical information for the environmental incident includes a 3D vapor cloud model displayed in combination with a 3D plan model of the area of interest.

A third feature, combinable with any of the previous or following features, wherein the weather data includes real-time wind speeds, real-time wind directions, real-time precipitation conditions, real-time temperature conditions, real-time humidity conditions, and weather predictions related to wind, precipitation, temperature, and humidity.

A fourth feature, combinable with any of the previous or following features, wherein the vapor cloud predictions include a size of the vapor cloud, a shape of the vapor cloud, and concentrations of hazardous components of the vapor cloud at different locations within the vapor cloud.

A fifth feature, combinable with any of the previous or following features, wherein the proactive and reactive data includes alerts and advisories for mitigating the environmental incident.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or a unit for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light-emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 protocols), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or a combination of communication types between network addresses.

The computing system can include clients and servers. A client and server are generally remote from each other and typically interact through a communication network. The relationship of client and server arises by virtue of computer programs running on the respective computers and having a client-server relationship to each other.

Cluster file systems can be any file system type accessible from multiple servers for read and update. Locking or consistency tracking may not be necessary since the locking of exchange file system can be done at application layer. Furthermore, Unicode data files are different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    collecting, in real time over a network for an environmental incident in an area of interest, field environmental data from environmental systems;
    tracking, in real time for the environmental incident in the area of interest, weather systems using weather data collected from weather systems;
    tracking, in real time for the environmental incident in the area of interest, changes in vapor cloud images and determining, using a vapor cloud model, vapor cloud predictions;
    tracking, in real time, events that occur in the area of interest;
    tracking emergency preparedness procedures corresponding to the area of interest;
    performing root cause analysis for the environmental incident using the collected data, the tracked data, and the determined vapor cloud predictions, wherein the root cause analysis is to identify a cause of the environmental incident; and
    performing an action based on the identified cause of the environmental incident, wherein performing the action includes providing, for display in the GUI, proactive and reactive data and key process indicators (KPIs) for the environmental incident, wherein the proactive and reactive data includes alerts and advisories for mitigating the environmental incident.

2. The computer-implemented method of claim 1, wherein performing the action based on the cause of the environmental incident includes one or more of:
    reporting environmental conditions for the environmental incident;
    providing, for display in a graphical user interface (GUI), graphical information for the environmental incident;
    receiving, from a user, inputs identifying actions to be performed; and
    performing the action based on the inputs.

3. The computer-implemented method of claim 2, wherein the graphical information for the environmental incident includes a 3-dimensional (3D) vapor cloud model displayed in combination with a 3D plan model of the area of interest.

4. The computer-implemented method of claim 1, wherein the weather data includes real-time wind speeds, real-time wind directions, real-time precipitation conditions, real-time temperature conditions, real-time humidity conditions, and weather predictions related to wind, precipitation, temperature, and humidity.

5. The computer-implemented method of claim 1, wherein the vapor cloud predictions include a size of the vapor cloud, a shape of the vapor cloud, and concentrations of hazardous components of the vapor cloud at different locations within the vapor cloud.

6. The computer-implemented method of claim 1, further comprising:
    receiving, from input provided by the user, scenario information for a scenario associated with potential environmental incidents, the scenario information including information defining a type of emergency including a type of hazardous material;
    storing the scenario information for the scenario in a scenarios repository;
    receiving, from input provided by the user, scenario search criteria for identifying the scenario from stored scenarios in the scenarios repository; and
    providing the scenario that matches the scenario selection criteria.

7. A non-transitory, computer-readable medium storing one or more instructions executable by a computer system to perform operations comprising:
    collecting, in real time over a network for an environmental incident in an area of interest, field environmental data from environmental systems;
    tracking, in real time for the environmental incident in the area of interest, weather systems using weather data collected from weather systems;
    tracking, in real time for the environmental incident in the area of interest, changes in vapor cloud images and determining, using a vapor cloud model, vapor cloud predictions;

tracking, in real time, events that occur in the area of interest;

tracking emergency preparedness procedures corresponding to the area of interest;

performing root cause analysis for the environmental incident using the collected data, the tracked data, and the determined vapor cloud predictions; and performing an action based on the root cause analysis, wherein performing the action includes providing, for display in the GUI, proactive and reactive data and key process indicators (KPIs) for the environmental incident, wherein the proactive and reactive data includes alerts and advisories for mitigating the environmental incident.

8. The non-transitory, computer-readable medium of claim 7, wherein performing the action based on the root cause analysis includes one or more of:

reporting environmental conditions for the environmental incident;

providing, for display in a GUI, graphical information for the environmental incident;

receiving, from a user, inputs identifying actions to be performed; and performing the action based on the inputs.

9. The non-transitory, computer-readable medium of claim 8, wherein the graphical information for the environmental incident includes a 3D vapor cloud model displayed in combination with a 3D plan model of the area of interest.

10. The non-transitory, computer-readable medium of claim 7, wherein the weather data includes real-time wind speeds, real-time wind directions, real-time precipitation conditions, real-time temperature conditions, real-time humidity conditions, and weather predictions related to wind, precipitation, temperature, and humidity.

11. The non-transitory, computer-readable medium of claim 7, wherein the vapor cloud predictions include a size of the vapor cloud, a shape of the vapor cloud, and concentrations of hazardous components of the vapor cloud at different locations within the vapor cloud.

12. The non-transitory, computer-readable medium of claim 7, the operations further comprising:

receiving, from input provided by the user, scenario information for a scenario associated with potential environmental incidents, the scenario information including information defining a type of emergency including a type of hazardous material;

storing the scenario information for the scenario in a scenarios repository;

receiving, from input provided by the user, scenario search criteria for identifying the scenario from stored scenarios in the scenarios repository; and providing the scenario that matches the scenario selection criteria.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:

collecting, in real time over a network for an environmental incident in an area of interest, field environmental data from environmental systems;

tracking, in real time for the environmental incident in the area of interest, weather systems using weather data collected from weather systems;

tracking, in real time for the environmental incident in the area of interest, changes in vapor cloud images and determining, using a vapor cloud model, vapor cloud predictions;

tracking, in real time, events that occur in the area of interest;

tracking emergency preparedness procedures corresponding to the area of interest;

performing root cause analysis for the environmental incident using the collected data, the tracked data, and the determined vapor cloud predictions; and performing an action based on the root cause analysis, wherein performing the action includes providing, for display in the GUI, proactive and reactive data and key process indicators (KPIs) for the environmental incident, wherein the proactive and reactive data includes alerts and advisories for mitigating the environmental incident.

14. The computer-implemented system of claim 13, wherein performing the action based on the root cause analysis includes one or more of:

reporting environmental conditions for the environmental incident;

providing, for display in a GUI, graphical information for the environmental incident;

receiving, from a user, inputs identifying actions to be performed; and performing the action based on the inputs.

15. The computer-implemented system of claim 14, wherein the graphical information for the environmental incident includes a 3D vapor cloud model displayed in combination with a 3D plan model of the area of interest.

16. The computer-implemented system of claim 13, wherein the weather data includes real-time wind speeds, real-time wind directions, real-time precipitation conditions, real-time temperature conditions, real-time humidity conditions, and weather predictions related to wind, precipitation, temperature, and humidity.

17. The computer-implemented system of claim 13, wherein the vapor cloud predictions include a size of the vapor cloud, a shape of the vapor cloud, and concentrations of hazardous components of the vapor cloud at different locations within the vapor cloud.

* * * * *